US010548335B2

(12) United States Patent
MacGregor

(10) Patent No.: US 10,548,335 B2
(45) Date of Patent: Feb. 4, 2020

(54) FILLING HEAD FOR FILLING A CONTAINER WITH FROZEN CONFECTION

(71) Applicant: Conopco, Inc., Englewood Cliffs, NJ (US)

(72) Inventor: Robert Anthony MacGregor, Milton Keynes (GB)

(73) Assignee: Conopco, Inc., Englewood Cliffs, NJ (US)

( * ) Notice: Subject to any disclaimer, the term of this patent is extended or adjusted under 35 U.S.C. 154(b) by 72 days.

(21) Appl. No.: 15/743,697

(22) PCT Filed: Jul. 1, 2016

(86) PCT No.: PCT/EP2016/065603
§ 371 (c)(1),
(2) Date: Jan. 11, 2018

(87) PCT Pub. No.: WO2017/012844
PCT Pub. Date: Jan. 26, 2017

(65) Prior Publication Data
US 2018/0206521 A1     Jul. 26, 2018

(30) Foreign Application Priority Data
Jul. 21, 2015  (EP) ..................................... 15177762

(51) Int. Cl.
A23G 9/28      (2006.01)
A23G 9/32      (2006.01)

(52) U.S. Cl.
CPC ............... A23G 9/282 (2013.01); A23G 9/32 (2013.01); A23G 2220/02 (2013.01); A23G 2220/20 (2013.01)

(58) Field of Classification Search
CPC .......... A23G 9/28; A23G 9/281; A23G 9/282; B67C 3/023; B67C 3/208
(Continued)

(56) References Cited

U.S. PATENT DOCUMENTS 2,784,681 A * 3/1957 Orrell .................... A23G 9/282
                                                          137/605
3,149,756 A    9/1964 Carpigiani
(Continued)

FOREIGN PATENT DOCUMENTS

DE            1511606       12/1902
DE        102009037780      3/2011
(Continued)

OTHER PUBLICATIONS

Search Report and Written Opinion in PCT/EP2016/065603, dated Sep. 16, 2016.
(Continued)

Primary Examiner — Marina A Tietjen
Assistant Examiner — Paul J Gray
(74) Attorney, Agent, or Firm — Gerard J. McGowan, Jr.

(57) ABSTRACT

A filling head comprising: a housing having a lower nozzle exit, a first material inlet, a second material inlet and a reciprocatable piston movable within the housing; the piston having a) an outer wall and upper and lower ends; b) a first internal material flow channel connecting an entry in the outer wall to an exit in the lower end, c) a second internal material flow channel connecting an entry in the outer wall to an exit in the lower end, and; wherein the exit of the first channel is annular, surrounding the exit of the second material flow channel; the piston, housing and inlets being positioned and dimensioned such that the piston in relation to the housing has: (1) an upper position wherein material flows from both first and second inlets are blocked by the piston outer wall; (2) a mid position wherein the first material inlet is in communication with the first internal material flow channel entry but the second material inlet is blocked by the piston outer wall; (3) a lower position wherein the first material inlet is in communication with the
(Continued)

first internal material flow channel entry and the second material inlet is in communication with the second internal material flow channel entry.

18 Claims, 2 Drawing Sheets

(58) Field of Classification Search
USPC ........... 141/104, 105, 305; 222/145.1, 145.3, 222/504; 137/516.13, 625.68
See application file for complete search history.

(56) References Cited

U.S. PATENT DOCUMENTS

| | | | |
|---|---|---|---|
| 3,420,268 A | | 1/1969 | Mueller |
| 3,477,393 A | * | 11/1969 | Bell ...................... A23G 9/282 425/131.1 |
| 4,608,810 A | | 9/1986 | Bordini |
| 4,643,335 A | | 2/1987 | Carnisio |
| 4,878,760 A | | 11/1989 | Newton et al. |
| 5,285,932 A | | 2/1994 | Boudreau |
| 5,382,090 A | | 1/1995 | Cocchi |
| 8,020,590 B2 | * | 9/2011 | Togni .................... B65B 39/004 141/104 |
| 8,895,097 B2 | * | 11/2014 | Farina .................... A23G 9/282 426/565 |
| 2006/0289078 A1 | | 12/2006 | Wingens et al. |

FOREIGN PATENT DOCUMENTS

| | | |
|---|---|---|
| EP | 2345332 | 7/2011 |
| GB | 1165448 | 10/1969 |
| JP | 50003951 | 1/1975 |
| JP | 54154692 | 12/1979 |
| JP | 57109786 | 7/1982 |
| JP | 58036300 | 8/1983 |
| WO | WO9402027 | 2/1994 |
| WO | WO9412048 | 6/1994 |
| WO | WO9703570 | 2/1997 |
| WO | WO2005048730 A1 | 6/2005 |
| WO | WO2010063572 | 6/2010 |
| WO | WO11120731 | 10/2011 |
| WO | WO2011152918 | 12/2011 |

OTHER PUBLICATIONS

Search Report in EP15177762, dated Sep. 22, 2015. pp. 1 to 3.
Written Opinion in EP15177762, dated Sep. 22, 2015. pp. 4 to 5.

* cited by examiner

FILLING HEAD FOR FILLING A CONTAINER WITH FROZEN CONFECTION

TECHNICAL FIELD

The present invention relates to a filling head for filling a container with a first frozen confection material encapsulating a second confection material.

BACKGROUND AND PRIOR ART

In a frozen confection factory, filling heads are employed to fill containers such as a mould, cone or tub. The time available for such filling is often very short, for example less than 2 seconds, and normally less than 1.5 seconds. Therefore, if anything other than a single homogenous product is desired to be delivered then a sophisticated filling head operation is required, given such tight time constraints.

EP 2345332 A1 discloses a filling head for producing a flow of first frozen confection encapsulating a second confection material.

The filling head comprises a housing and a reciprocating piston therein. To the housing is fed a first confection material to a first chamber and a second confection material to a second chamber.

The piston contains an internal material flow channel from its outer wall to its lower end.

The filling head is operated by lowering it into position in the vicinity of the bottom of a container. The piston is initially in its lowermost position blocking all flow of confection material. The piston is then moved up to a mid position, allowing the first frozen confection material to flow out of the filling head but blocking the second confection material. The piston is then moved to an upper position, where both first and second confection materials flow out of the nozzle.

Once the container is filled to the desired level the piston then moves rapidly downwards to its lowermost position so that the piston interrupts firstly the second confection material (as it reaches its mid position) and then the first confection material (as it reaches its lowermost position).

Such a filling head and its modes of operation can therefore coextrude the second confection material encapsulated within the first confection material.

However, if it is desired to have solid-like inclusions in the confection material, such inclusions can prevent the ability of the valve to fully close because in its lowermost position the piston pushes against the nozzle exit and can trap one or more inclusion pieces which may not be fully crushable and thus prevent the valve from closing.

Thus, improvements in the design and operation of a filling head for the delivery of an encapsulated second confection material within a first confection material, wherein solid-like inclusions are present would be highly desirable.

SUMMARY OF THE INVENTION

The invention relates to a filling head; the filling head comprising:
a housing having a lower nozzle exit, an first material inlet, a second material inlet and a reciprocatable piston movable within the housing;
the piston having
a) an outer wall and upper and lower ends;
b) a first internal material flow channel connecting an entry in the outer wall to an exit in the lower end,
c) a second internal material flow channel connecting an entry in the outer wall to an exit in the lower end, and; wherein the exit of the first channel is annular, surrounding the exit of the second material flow channel;
the piston, housing and inlets being positioned and dimensioned such that the piston in relation to the housing has:
(1) an upper position wherein material flows from both first and second inlets are blocked by the piston outer wall;
(2) a mid position wherein the first material inlet is in communication with the first internal material flow channel entry but the second material inlet is blocked by the piston outer wall;
(3) a lower position wherein the first material inlet is in communication with the first internal material flow channel entry and the second material inlet is in communication with the second internal material flow channel entry.

Thus, the piston produces a coextruded quantity of first and second confection in its lower position. When sufficient quantity has been delivered the piston moves upwards to a mid position in order to encapsulate the second filling confection by depositing a layer of first composition over the top. Once a sufficient amount of first material has been dispensed then flow is stopped by the piston moving to an upper position.

In a preferred arrangement the first material inlet is positioned below the second material inlet, and the first material flow channel entry is below the second material flow channel entry.

Thus, the valve typically operates by the process involving allowing frozen confection material to flow out of the nozzle exit into the container as the piston moves in a downstroke from (1) an upper position to (2) a mid position and then to (3) a lower position whereupon the first and second materials are coextruded from the exit nozzle, followed by an upstroke to (2) a mid position whereupon only first material is extruded from the exit nozzle to encapsulate the previously extruded second material, and then to (1) an upper position.

Thus, the action of stopping the flow of confection material is by sliding the surface of the piston upwards to block off the inlets to the housing. Thus, the action of closing the flow is not a crushing mode but a slicing mode. Thus any solid-like inclusions that are present will be sliced and cannot prevent the closing action of the piston.

A typical filling operation involves the insertion of the filling head into a container and allowing frozen confection material to flow out of the nozzle exit as the filling head rises above an evolving surface of frozen confection material until the container is substantially filled simultaneously with the movement (upstroke and downstroke) of the piston.

What is produced is an encapsulated second confection with a clean top layer of only first confection.

An additional advantage of the present filling head arises from the fact that the closing action after filling has occurred takes place as the piston is moving upwards to its upper position. This has the additional advantage of creating a small amount of suction, which results in a cleaner termination of flow, as it prevents further confection material from exiting the internals of the valve even after the flow has been shut off.

In a preferred process, the piston moves in its downstroke in a continuous movement, passing through the uppermost, mid and lower positions as it moves. Once at the lower position, the piston must stay there for sufficient time for sufficient coextrusion and therefore flow of the encapsulated second confection material. In a preferred process, the piston moves in its upstroke in a continuous movement, passing through the lowermost, mid position and uppermost position as it moves until flow is stopped at the uppermost position.

In a preferred process the time taken for the piston to move from the upper position to the lower position is from 0.2 to 2.0 seconds, more preferably from 0.2 to 1.0 seconds. In a most preferred process the time taken is from 0.2 to 0.6 seconds.

In a preferred process the time taken for the piston to move from the lower position to the upper position is from 0.2 to 2.0 seconds, more preferably from 0.2 to 1.0 seconds. In a most preferred process the time taken is from 0.2 to 0.6 seconds.

In a preferred process the time taken for the upstroke is substantially the same as the time taken for the downstroke.

The housing comprises a shaft within which the piston moves. In this embodiment the shaft comprises an opening for the first material inlet and an opening for the second material inlet. Typically the shaft will be dimensioned such that the outer walls of the piston engage with the walls of the shaft. This enables the physical positioning of the piston to be used to block or allow the flow of material into the shaft from inlets to the housing.

In the upper position, the first inlet is blocked by the physical presence of the piston preventing the flow of first material into the housing. Likewise, the second inlet is conveniently blocked by the physical presence of the piston preventing the flow of second material into the housing.

In the mid position, the first inlet is conveniently opened by virtue of the piston moving downwards and unblocking the nozzle outlet. However, in this position the second inlet is still conveniently blocked by the physical presence of the piston preventing the flow of second material into the housing.

In the lower position, the first inlet continues to remain open as it does for the mid position. However now the second material inlet is in communication with the second internal material flow channel by virtue of alignment between the opening in the outer wall of the piston with the second material inlet. This allows the second material to flow through the second internal material flow channel and appear out of the lower end of the piston. In this way the second material can be coextruded by being surrounded by an annular flow of first confection material.

Thus, in this embodiment the upper entry in the outer wall of the piston is positioned above the second material inlet when the piston is in both the upper and mid positions. When in the lower position the upper entry in the outer wall is in communication with the second material inlet.

The first frozen confection material of the present invention may be aerated. The term "aerated" means that gas has been intentionally incorporated into the product, such as by mechanical means. The gas can be any food-grade gas such as air, nitrogen or carbon dioxide. The extent of aeration is typically defined in terms of "overrun" (OR). In the context of the present invention, % overrun is defined in volume terms (measured at atmospheric pressure) as:

$$OR = \frac{\left(\begin{array}{c}\text{volume of frozen aerated product} - \\ \text{volume of premix at ambient } temp\end{array}\right)}{\text{(volume of premix at ambient } temp)} \times 100$$

The amount of overrun present in the product will vary depending on the desired product characteristics. In the context of the present invention the level of overrun is typically from 0 to 150%, preferably from 60 to 150%, more preferably from 60 to 100%.

Frozen confection material means a confection made by freezing a pasteurised mix of ingredients such as water, fat, sweetener, protein (normally milk proteins), and optionally other ingredients such as emulsifiers, stabilisers, colours and flavours. Frozen confection materials may be aerated. Frozen confection materials include ice cream, frozen yoghurt and the like. Preferably the first frozen confection material is an ice cream.

The frozen confectionery products that are produced by the process of the invention are typically single serving products e.g. 50-500 mL, preferably 70-200 mL in size. The frozen confection is preferably contained in a receptacle, which may be edible (e.g. a wafer or chocolate cone) or inedible (e.g. a tub).

The second confection may be frozen or non-frozen. If the second confection is frozen then it may have any of the properties described above in the context of the first frozen confection material. Preferably the second confection is a frozen confection.

The second confection may be any filling typically used in frozen confections, and may be liquid or solid. The relative amounts of first and second confections are controlled by adjusting the flow rate of the frozen confection material and the flow rate and/or the dose rate of the second confection. Preferably the second confection constitutes at least 20%, more preferably at least 30% or 40%, even more preferably at least 50%, most preferably at least 60% of the total weight of the product.

Solid second confections can include one or more discrete pieces of an edible material ("inclusions"), such as chocolate, fruit (which may be e.g. fresh, dried, frozen or sugar-infused), nut, biscuit, cake, cookie, toffee, fudge, nougat, marshmallow and the like. Preferably the solid inclusions are from 1 mm to 10 mm in size, more preferably from 2 to 9 mm, most preferably from 5 to 8 mm.

Suitable liquid second confections include fat-based compositions such as chocolate or couverture (i.e. a chocolate analogue containing a fat other than cocoa butter); fruit purees/sauces; creams, cookie dough, biscuit pastes, honey, syrups, caramel, toffee, nougat or fudge sauces and the like. The second confection may be in the form of a fondant or a paste. The second confection may be aerated, for example a fruit or chocolate mousse. The second confection may also be a frozen confection which differs in some way (such as in formulation, texture, flavour or colouring) from the first frozen confection material. We have found that the method and apparatus of the invention allow highly viscous liquid fillings to be dosed. For example, the second confection may have a viscosity of at least 100 mPas, more preferably at least 500 mPas, most preferably at least 1000 mPas (measured using a TA Instruments, AR 2000 rheometer with a concentric cylinder system at room temperature and a shear rate of 10 s−1).

The filling may be a mixture of one or more of the fillings described above. For example, liquid fillings may have solid inclusions suspended within them. In this case the inclusions are introduced into the liquid filing before the combined filling is pumped to the chamber. The amount of solid inclusions is preferably at least 2% by weight of the total filling (i.e. the combined amount of solid inclusions and liquid filling), more preferably at least 5 wt %. Preferably the amount of solid inclusions is less than 30 wt %, more preferably less than 20 wt %.

The frozen confection itself may also contain inclusions which are mixed into the frozen confection before the frozen confection is supplied to the inlets of the first chamber. Preferably the inclusions in the frozen confection are from 1 mm to 5 mm in size, more preferably from 3 to 4 mm. The amount of inclusions is preferably at least 2% by weight of the combined amount of these inclusions and the frozen confection, more preferably at least 5 wt %. Preferably the amount of inclusions is less than 20 wt %, more preferably less than 10 wt %. Adding inclusions into the frozen confection (as well as the filling) provides further interest for the consumer, and can also provide contrasting flavours and textures.

The invention will now be illustrated, by way of example, with reference to the following figures in which.

Figure 1:
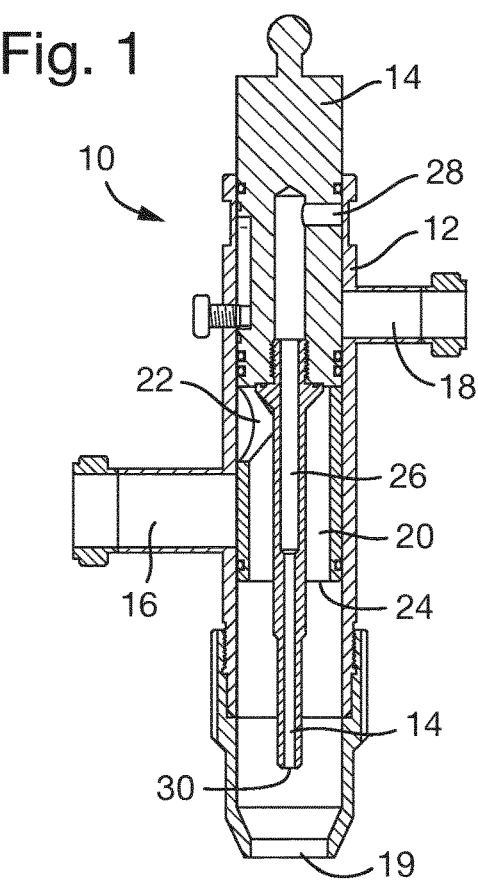
FIG. 1 is a side sectional view of a filling head according to the invention in its uppermost position.

Turning to the figures, FIG. 1 shows a filling head 10 comprising a housing 12 and a reciprocatable piston 14. The housing 12 comprises a first material inlet 16 and second material inlet 18 and a nozzle 19.

As can be seen in the figures the piston 14 makes a snug fit with the housing 12.

Within the piston 14 is a first internal material flow channel 20 connecting an upper entry 22 in the outer wall to an exit 24 in the lower end. Also within the piston is a second material flow channel 26 connecting an upper entry 28 in the outer wall to an exit 30 in the lower end.

The first material inlet 16 directly into the shaft of the housing 12 and meets the outer wall of the piston 14. Likewise, the second material inlet 18 feeds directly into the shaft of the housing 12 and meets the outer wall of the piston 14.

In the position shown in FIG. 1 the piston 14 is in its upper position. It can be seen that the flow of first confection material is blocked due to the presence of the outer wall of the piston 14. Likewise, flow of the second confection material is blocked by the presence of the outer wall of the piston 14. Thus in this position there is no flow of any confection material out of nozzle 19.

Figure 2:
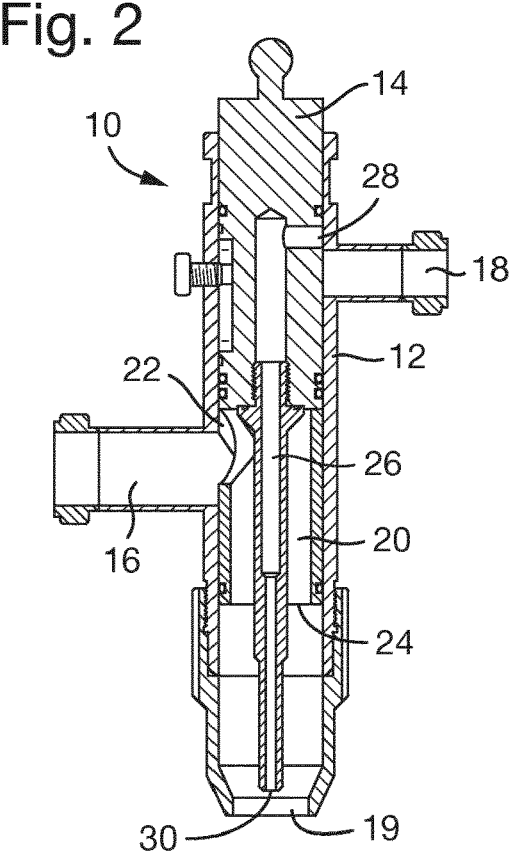
FIG. 2 is a side sectional view of a filling head according to the invention in its mid position.

In the position shown in FIG. 2 the piston 14 is in its mid position. It can be seen that there is communication between the first material inlet 16 and upper entry 22 of the first internal material flow channel 20. Thus, the first confection material can flow through the first material inlet 22, through the channel 20 and out of nozzle 19. Flow of the second confection material is still blocked by the presence of the outer wall of the piston 14.

Figure 3:
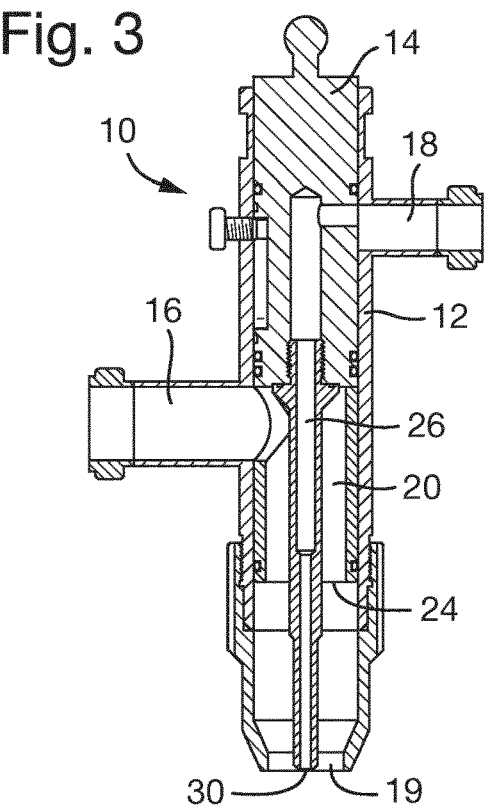
FIG. 3 is a side sectional view of a filling head according to the invention in its lower position.

In the position shown in FIG. 3 the piston 14 is in its lower position. It can be seen that there is communication between the first material inlet 16 and upper entry 22 of the first internal material flow channel 20. Thus, the first confection material can flow through the first material inlet 22, through the channel 20 and out of nozzle 19.

It can also be seen that upper entry 28 in the outer wall of piston 14 is aligned and in communication with second material inlet 18. Thus, the second confection can flow through the second material inlet 28, through the internal material flow channel 26 to the exit 30 in the lower end of the piston 14.

Furthermore, as the exit 30 is located centrally to the nozzle 19, and because the exit 24 is arranged in an annular fashion around exit 30, the result is that there is coextrusion from the nozzle 19 of a central region of second confection material surrounded by an annulus of first confection material.

In use, the entire filling head 10 is positioned above a container which is to be filled with confection. Filling begins as the piston moves downwards away from the position shown in FIG. 1. Initially, only first confection material flows out of nozzle to produce a base layer of first confection material in the container. As it moves downwards to the mid position this continues to be the case. Once the lower position is reached then coextrusion begins and a core of second confection material is produced within a surrounding annular region of first confection material.

Once sufficient material has been coextruded the piston moves upwards, closing off the flow of second confection material as the mid point is reached as shown in FIG. 2. This results in a top layer of encompassing first confection material. Flow is stopped when the piston reaches the upper position and the container is now full of second confection material fully encased in first confection material. In one particular embodiment, the entire process of filing takes a total of 1.2 seconds.

Figure 4:
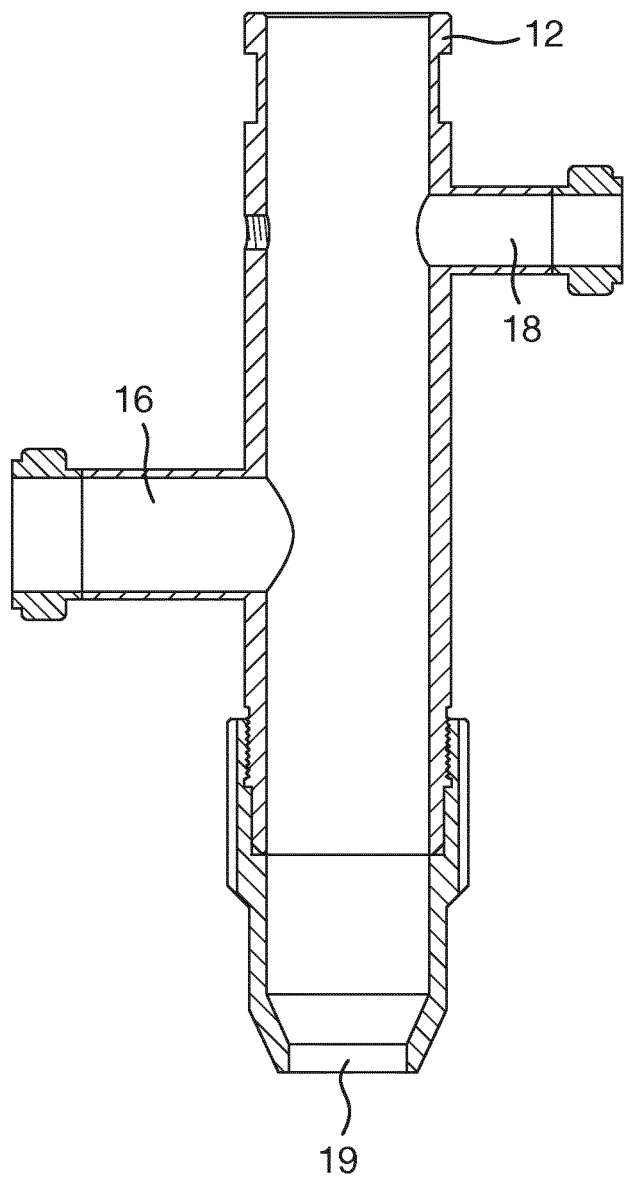
FIG. 4 is a side sectional view of the housing of a filling head according to the present invention.
Figure 5:
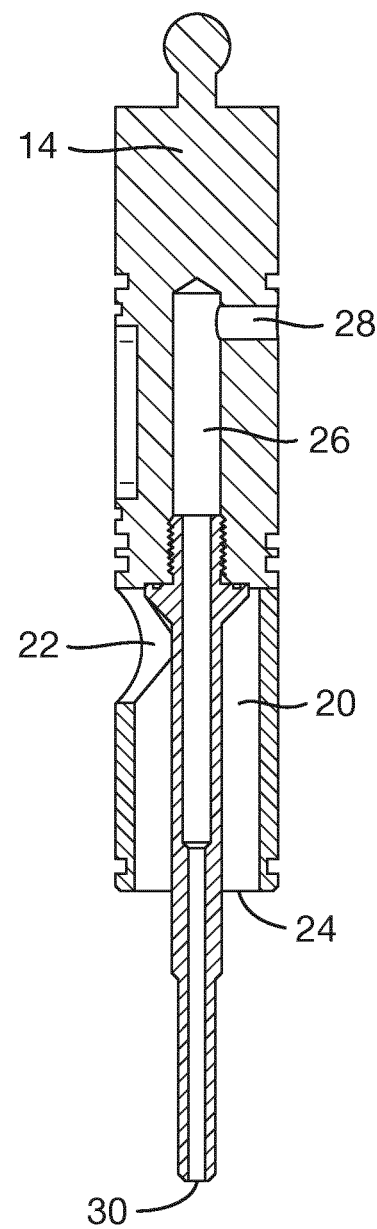
FIG. 5 is a side sectional view of a piston for the housing shown in FIG. 4.

FIGS. 4 and 5 show the filling head 10 separated into its respective housing 12 and piston 14 respectively. This enables the features of the two elements to be more clearly visualised.

The invention claimed is:

1. A filling head comprising:
   a housing having a lower nozzle exit, a first material inlet, a second material inlet and a reciprocatable piston movable within the housing;
   the piston having
      a) an outer wall and upper and lower ends;
      b) a first internal material flow channel connecting a first internal material flow channel entry in the outer wall to a first internal material flow channel exit in the lower end,
      c) a second internal material flow channel connecting a second internal material flow channel entry in the outer wall to a second internal material flow channel exit in the lower end, and;
      wherein the first internal material flow channel exit is annular, surrounding the second internal material flow channel exit;
   the piston, housing and inlets being positioned and dimensioned such that the piston in relation to the housing has:
      (1) an upper position wherein, material flows from both first and second inlets are blocked by the piston outer wall;
      (2) a mid position wherein the first material inlet is in communication with the first internal material flow channel entry but the second material inlet is blocked by the piston outer wall;
      (3) a lower position wherein the first material inlet is in communication with the first internal material flow channel entry and the second material inlet is in communication with the second internal material flow channel entry.

2. A filling head according to claim 1, wherein the housing comprises a housing shaft within which the piston moves, the housing shaft comprising the first material inlet and the second material inlet, the housing shaft comprising walls.

3. A filling head according to claim 2, wherein the housing shaft is dimensioned such that the outer wall of the piston engages with the walls of the housing shaft.

4. A filling, head according to claim 1, wherein the first material inlet is positioned below the second material inlet, and the first internal material flow channel entry is below the second internal material flow channel entry.

5. A process of delivering frozen confection material from a filling head according to claim 1, wherein the piston moves in a downstroke from (1) the upper position to (2) the mid position whereupon only first material is extruded from the nozzle exit and then to (3) the lower position whereupon the first and second materials are coextruded from the nozzle exit, followed by an upstroke to (2) the mid position whereupon only first material is extruded from the nozzle exit to encapsulate the previously extruded second material, and then to (1) the upper position.

6. A process according to claim 5, involving the insertion of the filling head into a container and, simultaneously with the movement of the piston, allowing frozen confection material to flow out of the nozzle exit as the filling head rises above an evolving surface of frozen confection material until an encapsulated second confection with a clean top layer of only first confection is produced just as the piston reaches the upper position on the return upstroke.

7. A process according to claim 5, wherein the piston moves in the downstroke in a continuous movement, passing through the upper position, the mid position and the lower position as the piston moves.

8. A process according to claim 5, wherein the piston moves in the upstroke in a continuous movement, passing through the lower position, the mid position and the upper position as the piston moves until flow is stopped at the upper position.

9. A process according to claim 5, wherein the time taken for the piston to move from the upper position to the lower position is from 0.2 to 2.0 seconds.

10. A process according to claim 5, wherein the time taken for the piston to move from the lower position to the upper position is from 0.2 to 2.0 seconds.

11. A process according to claim 5, wherein the time taken for the upstroke is substantially the same as the time taken for the downstroke.

12. A process according to claim 5, wherein the first frozen confection material is an ice cream.

13. A process according to claim 5, wherein the first and/or second confectionery material contains solid-like inclusions.

14. The process according to claim 9 wherein the time taken for the piston to move from the upper position to the lower position is from 0.2 to 1.0 seconds.

15. The process according to claim 14 wherein the time taken for the piston to move from the upper position to the lower position is from 0.2 to 0.6 seconds.

16. A process according to claim 10, wherein the time taken for the piston to move from the lower position to the upper position is from 0.2 to 2.0 seconds.

17. A process according to claim 10, wherein the time taken for the piston to move from the tower position to the upper position is from 0.2 to 1.0 seconds.

18. A process according to claim 10, wherein the time taken for the piston to move from the lower position to the upper position is from 0.2 to 0.6 seconds.

* * * * *